United States Patent [19]

Montgomery

[11] Patent Number: 5,462,699
[45] Date of Patent: Oct. 31, 1995

[54] FIRE RETARDANT MATERIALS AND METHODS OF USE THEREOF

[75] Inventor: Robert L. Montgomery, Dunnellen, Fla.

[73] Assignee: Fireblock International, Inc., Leesburg, Fla.

[21] Appl. No.: 184,829

[22] Filed: Jan. 21, 1994

Related U.S. Application Data

[62] Division of Ser. No. 42,022, Apr. 2, 1993, abandoned.

[51] Int. Cl.$^6$ ............................ C09K 21/02; C09D 5/16; B27N 9/00
[52] U.S. Cl. ................. 252/609; 252/607; 252/610; 106/18.11; 106/18.12; 428/920; 428/921; 521/146
[58] Field of Search ..................... 252/610, 609, 252/607; 106/18.11, 18.12; 428/446, 451, 452, 453, 308.1, 319.1, 327, 331, 396, 920, 921; 521/146, 155, 906, 907

[56] References Cited

U.S. PATENT DOCUMENTS

| | | | |
|---|---|---|---|
| 1,129,320 | 2/1915 | Vail et al. | 252/606 |
| 1,847,366 | 3/1932 | Spencer | 252/606 |
| 1,949,914 | 3/1934 | Larson | 87/17 |
| 2,827,384 | 3/1958 | VonFreyhold | 106/74 |
| 3,429,836 | 2/1969 | Stastny et al. | 521/146 |
| 3,607,794 | 9/1971 | Abbotson et al. | 521/146 |
| 4,011,195 | 3/1977 | Self | 106/83 |
| 4,052,347 | 10/1977 | Dieterich et al. | 521/146 |
| 4,179,535 | 12/1979 | Kalbskopf et al. | 427/206 |
| 4,224,169 | 9/1980 | Retana | 252/8.1 |
| 4,234,639 | 11/1980 | Graham | 428/144 |
| 4,338,374 | 7/1982 | Neser | 428/411 |
| 4,487,712 | 12/1984 | Wilson et al. | 252/78.3 |
| 4,816,186 | 3/1989 | Acitelli | 252/610 |
| 4,871,477 | 10/1989 | Dimanshteyn | 252/609 |
| 5,047,283 | 9/1991 | Leatherman et al. | 428/209 |
| 5,130,184 | 7/1992 | Ellis | 428/245 |

OTHER PUBLICATIONS (6) BASF Foam Plastics, "Styropor® expandable polystyrene (EPS): Processing of Styropor," (pp. 1–35)., 1992.
(13) Oxychem, "Sodium Silicates Handbook," *Occidental Chemical Corporation*, (pp. 1–20)., 1988.
(14) The PQ Corporation, "Sodium Silicates Liquids/Solids," Bulletin 17–103, (pp. 1–17)., 1987.
(15) The PQ Corporation, "Bonding and Coating Applications of PQ® Soluble Silicates," Bulletin 12–31, (six pages)., 1984.
(16) Vail, James G., "Soluble Silicates Their Properties and Uses, vol. 2: Technology," *American Chemical Society*, Monograph Series #116, 1952, (pp. 230–231)., 1952.

*Primary Examiner*—Philip Tucker
*Assistant Examiner*—Joseph D. Anthony
*Attorney, Agent, or Firm*—Jones & Askew

[57] ABSTRACT

The present invention relates to a fire retardant composition that is applied to materials such as building materials and corrugated board materials.

The invention also relates to a method of making a fire retardant composition, and the use thereof for producing fire retardant materials, including insulating roofing materials, such as expanded polystyrene roofing.

14 Claims, No Drawings

FIRE RETARDANT MATERIALS AND METHODS OF USE THEREOF

CROSS-REFERENCE TO RELATED APPLICATION

This is a division of application Ser. No. 08/042,022, filed Apr. 2, 1993, abandoned.

TECHNICAL FIELD

The present invention relates to a fire retardant composition that is applied to materials such as building materials and corrugated board materials. The invention also relates to a method of making a fire retardant composition, and the use thereof for producing fire retardant materials, including insulating roofing materials, such as expanded polystyrene roofing.

BACKGROUND OF THE INVENTION

Flat metal roofs are often used in commercial buildings, such as merchandise stores and warehouses. Metal roofs often are covered with an insulating material such as polystyrene board, or urethane board. Polystyrene board, however, presents a fire hazard and requires the installation of an intermediate layer of fire retardant between the metal roof and the insulating polystyrene board. The fire retardant materials that are currently used include fiberboard, perlite board, or gypsum board. It is expensive to purchase and install such fire retardant materials.

Consequently, most commercial metal roofs today employ urethane insulating boards which do not require the intermediate layer of fire retardant. However, urethane production requires the use of chlorinated fluorocarbons which damage the environment, and contribute to the erosion of ozone in the atmosphere. Further, it appears that recently promulgated federal regulations will restrict or ban the use of chlorinated fluorocarbons in the future. Consequently, urethane roofing insulation could have to be processed using different methods that will result in lower fire retardant characteristics.

What is needed, therefore, is an inexpensive fire retardant composition that can be easily applied to building materials such as expanded polystyrene boards.

SUMMARY OF THE INVENTION

The present invention addresses this need in the prior art by providing a fire retardant composition that may be readily applied to absorbent or porous or other building materials or corrugated board materials, or other desired materials. The present invention further addresses this need in the prior art by providing a method of making a fire retardant composition, and the use thereof for producing fire retardant materials, including insulating roofing materials, such as expanded polystyrene boards. The composition of the present invention is relatively inexpensive to manufacture and apply, thus further addressing the need in the prior art.

The present invention includes a fire retardant composition comprising silicate or silica, water, and surfactant. More specifically, the present invention includes a fire retardant composition comprising at least approximately 15% silicate ($SiO_3^{-2}$), 85% or less water, and surfactant. The ratio of the silicate to the water in the fire retardant composition is between approximately 20/80 (by weight, hereinafter referred to as "w/w") and approximately 33/67 (w/w). The volume of the surfactant added to approximately 600 pounds of the silicate/water solution is between approximately 16 and 64 ounces.

In one embodiment of the invention, an effective amount of a fire retardant composition is applied to one side of a building material, such as an expanded polystyrene board. The composition provides a thermal protective or fire retardant barrier. In another embodiment of the invention, an effective amount of an additional fire retardant composition, such as borax, is subsequently applied to the material. In yet another embodiment of the invention, an effective amount of a fire retardant composition is applied to one side of the building material, the material is subsequently coated with an effective amount of a weather proofing agent, and then optionally an effective amount of an additional fire retardant composition, such as borax, is applied to the material.

The present invention thus provides an inexpensive and effective fire retardant composition that can be applied directly to any material, including but not limited to the following materials: expanded polystyrene, urethane, wood, cellular foam plastics, and corrugated board materials. More specifically, the present invention provides a fire retardant composition that can be applied directly to building materials, thus greatly reducing the financial and environmental costs of such fire retardant building material, and the difficulty of its installation. Further, the composition may be incorporated into paint formulations.

It is an object of the present invention to provide an improved fire retardant composition.

It is a further object of the present invention to provide a fire retardant treated building material which is inexpensive to manufacture.

It is also an object of the present invention to provide fire retardant treated building material which satisfies Underwriter Laboratory Flammability requirements.

It is yet another object of the present invention to provide a fire retardant composition, and fire retardant treated building material that significantly reduces pollution to the environment.

It is another object of the present invention to provide a fire retardant composition, and fire retardant treated building material that significantly reduces safety or health dangers to the following: inhabitants of the structure which incorporates such building materials; to manufacturers of the composition or building material; or to installers, transporters, and other handlers of the composition or building material.

It is a further object of the present invention to provide a fire retardant composition, and fire retardant treated building material which may be rapidly and easily manufactured.

It is yet another object of the present invention to provide a fire retardant treated building material which may be manufactured, and immediately stacked for storage or transportation.

It is another object of the present invention to provide a fire retardant composition, and fire retardant treated building material which may be manufactured, and immediately installed.

It is also an object of the present invention to provide a fire retardant treated building material which is easily and inexpensively installed.

It is another object of the present invention to provide a fire retardant treated building material which may be manufactured at the construction site.

It is a further object of this invention to provide fire retardant treated corrugated board materials.

It is also an object of this invention to provide fire retardant paint products.

It is another object of this invention to provide a method of making the above-described fire retardant composition and fire retardant treated materials.

These and other objects, features and advantages of the present invention will become apparent after a review of the following detailed description of the disclosed embodiments and the appended claims.

DETAILED DESCRIPTION

The present invention includes a fire retardant composition that may be applied to absorbent or porous or other building materials. The present invention also includes a method of making a fire retardant composition, and the use thereof for producing fire retardant materials, including insulating roofing materials, such as expanded polystyrene boards. The composition of the present invention is relatively inexpensive to manufacture and apply. The invention further includes materials treated with the fire retardant composition.

A "fire retardant composition" may be a composition that, when applied to a material, thermally protects the material as it reduces or eliminates the tendency of the material to burn, or enables the material to resist combustion for a period of time without significant burning or failing structurally, or reduces the rate of flame spread of the material.

A 37 fire retardant material" may be a material that has been treated with a fire retardant composition of the present invention, which therefore reduces or eliminates the tendency to burn, or is able to resist combustion for a period of time, or is able to reduce the rate of flame spread.

A "weather proofing agent" is a material that, when applied, partially or completely protects a surface from moisture and ultraviolet light, or other conditions which reduce or eliminate the properties of a material.

An "absorbent material" may be a material capable of taking up a substance in bulk or is a material which is capable of being penetrated by another material.

A "porous material" may be a material containing pores through which fluids, and/or light may pass, or is a material capable of absorbing liquids. The terms "absorbent material"and "porous material" are used interchangeably herein.

A "surfactant" includes, but is not limited to detergents and surfactants that facilitate the application and promote the penetration of the fire retardant composition of the present invention into a material.

A "silicate" includes but is not limited to the silicate ion ($SiO_3^{-2}$), and other ionic forms of silica that may be dispersed in an aqueous solution. The counter ion is not considered to be critical to the invention. The counter ion includes, but is not limited to sodium, calcium, potassium, and magnesium.

A "building material" includes, but is not limited to a porous or an absorbent material which may be used in the construction and assembly of structures. Building materials include but are not limited to insulation materials, roofing materials, foundation materials, and structural materials.

An "ounce" is defined as an ounce by weight, which is one-sixteenth of a pound, and is not a fluid ounce, which is measured by volume.

The present invention includes a fire retardant composition comprising silicate ($SiO_3^{-2}$), water, and surfactant.

Many surfactants may be used in the present invention. Nonionic surfactants useful in the present invention include, but are not limited to the following: various polyoxyethylene ethers, such as Triton X-100; n-decyl β-D-glucopyranoside; diethylene glycol menopentyl ether; n-dodecyl β-D-glucopyranoside; n-dodecyl β-D-maltoside; n-heptyl β-D-glucopyranoside; n-octyl β-D-glucopyranoside; n-octyl α-D-glucopyranoside; octylphenol-ethylene oxide condensates; n-nonyl β-D-glucopyranoside ethylene oxide condensates of fatty alcohols; and various polyoxyethylenesorbitans and sorbitans. Anionic surfactants useful in the present invention include, but are not limited to, the sodium salts of the following: Pentex 99 (dioctyl sodium sulfosuccinate); lauryl sulfate; caprylic acid; cholic acid; 1-dodecanesulfonic acid; 1-decanesulfonic acid; 1-heptane sulfonic acid; 1-hexanesulfonic acid; deoxycholic acid; glycocholic acid; glycodeoxycholic acid; taurocholic acid; and taurodeoxycholic acid. Cationic surfactants useful in the present invention include, but are not limited to the following: cetylpyridinium chloride; dodecyltrimethylammonium bromide; hexadecyltrimethylammonium bromide; and tetradecyltrimethylammonium bromide. Zwitterionic surfactants useful in the present invention include, but are not limited to the following: (3-[(3-cholamidopropyl)-dimethylammonio]- 1-propane sulfonate); (3-[(3-cholamidopropyl)-dimethylammonio]- 2-hydroxy-1-propane sulfonate; and N-decyl-N,N-dimethyl-3-ammonio-1-propane sulfonate. The above surfactants can be used alone or in combination. Preferred surfactants are Pentex 99 and Triton X-100.

Any source of silicate in an aqueous solution, or form of silicate that can be dispersed in an aqueous solution, may be used in the present invention. The counter ion is not considered to be critical to the invention. The counter ion includes, but is not limited to sodium, calcium, potassium, and magnesium. Examples of the silicate used for the present invention include, but are not limited to sodium silicate, sodium disilicate, sodium metasilicate, sodium orthosilicate, potassium metasilicate, potassium tetrasilicate, colloidal silica, and precipitated silica. The above silicates may be used alone or in combination. A preferred silicate is sodium silicate. Colloidal silica is supplied by E. I. Dupont de Nemours & Co. under the mark LUDOX, and is also supplied by Nalco Co. Colloidal silica is produced by treating a silicate, such as sodium silicate, with an ion exchanger which replaces the sodium ion with a hydrogen ion. PPG Industries, Inc. (Pittsburgh Plate Glass) produces precipitated silica which differs from colloidal silica in that it has a different particle size. Silicate solutions are commercially available in a variety of different concentrations. For example, Power Silicates, Inc. (Augusta, Ga.), supplies sodium silicate in sodium oxide and water solutions where the percent silicate ranges from 28.5 to 33.1% and the percent sodium oxide ($Na_2O$) ranges from 8.7 to 17.9%. The sodium oxide is present in the silicate solution as a product of the fluxing agent, sodium carbonate ($Na_2CO_3$). A preferred source of silicate is an aqueous solution comprising approximately 29.6% silicate, and 9.2% sodium oxide.

The present invention includes a fire retardant composition comprising at least approximately 15% silicate, 85% or less water, and surfactant.

In one embodiment, where solutions of silicate which also contain sodium oxide are utilized in the preparation of the fire retardant composition, the ratio of the silicate to the sodium oxide to the water in the fire retardant composition is between approximately 22/7/71 (w/w/w) and approximately 28/8.5/63.5 (w/w/w). Those of ordinary skill in the art will appreciate that if a commercially supplied silicate solution is utilized, such a solution may contain certain other elements (such as sodium oxide). The volume of the surfactant added to approximately 600 pounds of the silicate/sodium oxide/water solution is between approximately 16 and 64 ounces, although other volumes may be useful, depending on the particular surfactant used.

A preferred ratio of the silicate to the sodium oxide to the water in a fire retardant composition prepared from a silicate solution which also contains sodium oxide is between approximately 24/7.5/68.5 (w/w/w) and approximately 26/8/66 (w/w/w), wherein the volume of the surfactant is between approximately 24 and 48 ounces per 600 pounds of silicate, sodium oxide, and water. A most preferred ratio of the silicate to the sodium oxide to the water in the fire retardant composition manufactured from a silicate solution which also contains sodium oxide is approximately 25/7.7/67.3 (w/w/w), wherein a most preferred volume of the surfactant added to approximately 600 pounds of the silicate/sodium oxide/water solution is approximately 48 ounces, when the surfactant is Triton X-100 or Pentex 99.

In another embodiment, where the fire retardant composition is prepared using a source of silicate which does not contain sodium oxide, the ratio of silicate to the water in the fire retardant composition is between approximately 20/80 (w/w) and approximately 33/67 (w/w). The volume of the surfactant added to approximately 600 pounds of the silicate/water solution is between approximately 16 and 64 ounces, although other volumes may be useful, depending on the particular surfactant used. One of ordinary skill in the art can determine the appropriate amount of surfactant to use without undue experimentation.

A preferred ratio of the silicate to the water in the fire retardant composition is between approximately 25/75 (w/w) and approximately 29/71 (w/w), wherein the volume of the surfactant is between approximately 24 and 48 ounces per 600 pounds of silicate, and water. A most preferred ratio of the silicate to the water in the fire retardant composition is approximately 27/73 (w/w), wherein a most preferred volume of the surfactant added to approximately 600 pounds of the silicate/water solution is approximately 48 ounces, when the surfactant is Triton X-100 or Pentex 99.

The present invention provides an inexpensive and effective fire retardant composition that can be applied directly to any absorbent or porous material, including but not limited to the following building materials: expanded polystyrene, urethane, wood, and cellular foam plastics. A preferred building material is expanded polystyrene. The building materials may be used anywhere throughout a structure to provide a fire resistant barrier.

The area of the material to be treated by the fire retardant composition may be determined by the expected use of the fire retardant treated material, and the thickness of the fire retardant treated material. For example, expanded polystyrene boards two to seven and one half inches thick optionally may be treated on only one side as the fire retardant will soak through most of the absorbent board. However, for very thick materials, or for less porous materials, depending on the intended use of the materials, several of the surfaces may be treated. It is preferred that only one side be treated with fire retardant if the material is expanded polystyrene of less than twelve inches thick.

In one embodiment of the invention, an effective amount of a fire retardant composition is applied to one or more sides of a building material, such as an expanded polystyrene board. The composition provides a thermal protective or fire retardant barrier. In another embodiment of the invention, an effective amount of a fire retardant composition is applied to one or more sides of a building material, such as an expanded polystyrene board, and then an effective amount of an additional fire retardant composition, such as borax, is applied to the material on the surfaces that were treated with the fire retardant composition.

In yet another embodiment of the invention, an effective amount of a fire retardant composition is applied to one or more sides of the building material, the treated sides of the material are subsequently coated with an effective amount of a weather proofing agent, and then optionally an effective amount of an additional fire retardant composition, such as borax, is applied to the treated sides of the material.

The fire retardant compositions are applied to the materials by any method known in the art. The retardant composition may be applied by spray, by power paint rollers (saturated rollers), or by brush. Preferably, the composition is applied by spray. These and other application processes are well known in the art and are subject to many variations. Consequently, other ways of treating building material with fire retardant compositions of the present invention are encompassed by, and intended to be comprised within, the scope of the appended claims. Also, the material may be optionally perforated to increase penetration of the fire retardant prior to the application of the fire retardant.

The fire retardant is applied at a suitable rate to produce a material treated with an effective amount of fire retardant. The amount of the fire retardant composition to be applied to the material varies according to several factors including the type of material selected, the ratio of the composition selected, the porosity of the material, and the dimensions of the material to be treated. Preferably, between approximately 0.5 to 4 ounces of the fire retardant composition are applied to each square foot of surface area to be treated, where the thickness of the material is less than approximately 7.5 inches. Most preferably, approximately 2.5 ounces of the composition is to be applied to each square foot of surface to be treated, where the thickness of the material is less than approximately 7.5 inches.

For materials having a thickness of more than approximately 7.5 inches, the following amounts of fire retardant composition may be applied: between approximately 0.5 to 4 ounces of the fire retardant composition per square foot of surface area to be treated per the first 7.5 inches of material, plus between approximately 0.5 to 4 more ounces of the fire retardant composition per square foot of surface area to be treated for every additional 2 inches of thickness of the material. Preferably, between approximately 2 to 3 ounces of the fire retardant composition for the first 7.5 inches of material plus between approximately 2 to 3 additional ounces for every additional 2 inches of thickness of the material are applied to each square foot of surface area to be treated. Most preferably, approximately 2.5 ounces of the fire retardant composition plus approximately 2.5 additional ounces for every two inches of thickness of the material above 7.5 inches, is applied to each square foot of surface area to be treated.

The above amounts of the fire retardant composition to be applied to a material refer to methods where only one side of the material is treated. Where two sides of the building material of approximately the same surface area are treated, the application amounts may be halved. Where more than two sides of the material are treated, then the amount of the fire retardant composition that is applied to each square foot of surface area to be treated is reduced in proportion to the increased amount of the surface area that is treated so that approximately the same total amount of the fire retardant composition is applied to the board whether it is applied to only one, or more of its surfaces.

In an embodiment of the invention, the building material is a four foot by eight foot board of expanded polystyrene. Although the board may be any thickness, in order to be evaluated and certified by Underwriters Laboratory, the board must be between 2 and 7.5 inches thick. Between approximately 4 and 6 pounds of the fire retardant may be applied to one side of each four foot by eight foot board where the board is less than approximately 7.5 inches thick. Preferably, approximately 5 pounds of the fire retardant composition is applied to one side of each four foot by eight foot board, where the board is less than or equal to approximately 7.5 inches thick.

In another embodiment of the invention, the building material is a four foot by eight foot board of expanded polystyrene which is approximately 11.5 inches thick. Most preferably, approximately 7.5 ounces of the fire retardant composition is applied to each square foot of surface area to be treated on one side of the board. In the alternative, the application amount is halved, and both surfaces of the material are treated.

In another embodiment, the fire retardant treated board is subsequently treated with an effective amount of an additional fire retardant. The additional fire retardant composition of this embodiment of the invention includes, but is not limited to, borax (sodium tetraborate decahydrate), calcium carbonate, zinc stearate, powdered mica, and aluminum trihydrate. The above additional fire retardants may be used alone or in combination. A preferred additional fire retardant is borax.

The additional fire retardant composition may function as a quick drying agent and as a fire retardant. Preferably, between approximately 0.5 and 1.5 pounds of the second fire retardant composition is applied to approximately 32 square feet of surface area. Most preferably, approximately one pound of the additional fire retardant composition is applied to approximately 32 square feet of surface area.

The additional fire retardant composition is sprinkled uniformly over the treated sides of the fire retardant treated board before it has completely dried. The additional fire retardant composition, in powder form, may be applied by a sifting, straining, or screened process. The method of applying the additional fire retardant composition is not critical to the invention; any of the several methods of the application of a powder known in the art may be utilized. Such application processes are well known in the art and subject to many variations. Consequently, other ways of treating building material with fire retardant compositions of the present invention are encompassed by, and intended to fall within, the scope of the appended claims.

Excess fire retardant composition which remains after the building material is completely dry may optionally be brushed or blown off by a brush or blower, or by any other means known in the art. The method of removing the excess additional fire retardant is not critical to the invention; any of the several methods of removal of excess powder in the art may be utilized.

In yet another embodiment of the present invention, one or more sides of a building material are treated with an effective amount of fire retardant composition, and the treated sides are subsequently coated with an effective amount of a weather proofing agent to provide resistance to deterioration by moisture or ultraviolet radiation, and finally the treated sides are optionally treated with an effective amount of an additional fire retardant composition such as borax. The excess additional fire retardant composition is subsequently optionally brushed off.

The weather proofing agents are to be applied to the surfaces of the treated building material which are expected to be exposed to moisture or ultraviolet light. Between approximately 8 and 16 ounces, by weight, of the weather proofing agent may be applied for every 32 square feet of surface area to be treated. The weather proofing agents that may be used include, but are not limited to: rubber, such as styrene-1,3-butadiene; acrylic; latex; and wax. The above weather proofing agents may be used alone or in combination. A preferred weather proofing agent is styrene-1,3-butadiene rubber.

Methods of application of weather proofing agents are well known in the art. The agents may be applied by a brush, a roller, or more preferably, by a spraying apparatus. The method of the application of weather proofing agents is not critical to the invention; any of the several methods known in the art may be utilized.

The fire retardant composition of the present invention may also be used to treat corrugated board materials, such as card board containers and packaging materials. The amount of the fire retardant composition to be applied to the corrugated board varies according to the thickness of the corrugated board, the composition of the corrugated board, the concentration of the fire retardant composition selected, and the dimensions of the material to be treated. Preferably, between approximately 0.5 to 3 ounces of the fire retardant composition are applied to each square foot of surface area of corrugated board to be treated. More preferably, between approximately 1.0 to 2.0 ounces of the fire retardant composition are applied to each square foot of surface area of corrugated board to be treated. Most preferably, approximately 1.5 ounces are applied per square foot of surface area of corrugated board.

The above amounts of the fire retardant composition to be applied to corrugated board refer to when the composition is applied to only one side of the board. Where two sides of the corrugated board are treated, the application amounts may be halved. Where more than two sides of the corrugated board are to be treated, the amount of the fire retardant composition that is applied to each square foot of surface area to be treated is reduced in proportion to the increased amount of the surface area that is treated so that approximately the same total amount of the fire retardant composition is applied to the board irrespective of whether it is applied to one, or more of its surfaces.

Methods of application of the fire retardant composition are well known in the art. The composition may be applied by brush, roller, or more preferably, by spray. The method of application of the composition is not critical to the invention; any of the several methods known in the art may be utilized.

The fire retardant composition may also be employed to produce fire retardant paints. The method of mixing fire retardant compositions into paint formulations is well known in the art, and is not critical to the invention. Therefore, any method may be utilized.

The following examples will serve to further illustrate the present invention without, at the same time, however, constituting any limitation thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Five hundred pounds of a solution of sodium silicate, at a density of 42 degrees, is mixed with 100 pounds of water and 48 liquid ounces of Pentex 99 (dioctyl sodium sulfosuccinate). The above 42 degrees solution of sodium silicate comprises 29.6% silicate, 9.2% sodium oxide, and 61.2% water.

EXAMPLE 2

The fire retardant composition of example 1 is applied to one side of a building material, such as expanded polystyrene board, at approximately 5 pounds of fire retardant composition per a four foot by eight foot board, where the board is between approximately 2 to 7.5 inches thick.

EXAMPLE 3

The fire retardant composition of example 1 is applied to one side of a building material, such as expanded polystyrene board, at approximately 5 ounces per square foot of surface area to be treated, where the board is approximately 9.5 inches thick.

EXAMPLE 4

The fire retardant composition of example 1 is applied to two sides of a building material, such as expanded polystyrene board, at a coating density of approximately 2.5 ounces per square foot of surface area to be treated, where the board is approximately 9.5 inches thick.

Where more than two sides of the material is treated, the amount of the fire retardant composition that is applied to the material is reduced in proportion to the increased amount of surface area that is treated so that approximately the same total amount of the fire retardant composition is applied to the board whether it is applied to only one, or to all of its surfaces.

EXAMPLE 5

The fire retardant composition of example 1 is applied to one side of a building material, such as expanded polystyrene board, at approximately 7.5 ounces per square foot of surface area to be treated, where the board is approximately 11.5 inches thick.

In the alternative, approximately 3.8 ounces of the fire retardant composition of example 1 is applied to each square foot of surface area of the material to be treated, where the board is approximately 11.5 inches thick, and where two sides of the building material are treated.

EXAMPLE 6

The fire retardant composition of example 1 is applied to a building material as described in examples 2, 3 4, or 5. Prior to the fire retardant composition completely drying on the board, borax powder is applied to the treated sides of the building material.

EXAMPLE 7

The excess borax on the treated board of example 6 is brushed off.

EXAMPLE 8

The fire retardant treated building material of examples 2, 3, 4, or 5 is subsequently treated by applying at least 8 ounces, by weight, of a weather proofing agent to the treated sides of the fire retardant treated building material for every 32 square feet of surface area to be treated.

EXAMPLE 9

The fire retardant treated board prepared in example 8 further is subsequently treated by the application of another fire retardant, such as borax, to the treated sides of the board.

EXAMPLE 10

The fire retardant treated boards prepared in the above examples are placed onto metal roofs, with the treated surface of the board facing the metal roof. The method of fastening the boards to the roof is not critical to the invention. Therefore, the boards are kept in place on the roof by any method known in the art. The boards on the roof function as insulated roofing material.

EXAMPLE 11

The fire retardant treated boards prepared in the above examples are placed in between the floors or rooms of a structure to provide a fire insulated barrier. The method of holding the boards in place is not critical to the invention. Therefore, the boards are kept in place by any method known in the art.

EXAMPLE 12

The fire retardant composition of example 1 is applied to one side of a corrugated board. Approximately 1.5 ounces of the fire retardant composition of example 1 are applied per square foot of surface area to be treated.

EXAMPLE 13

The fire retardant composition of example 1 is mixed thoroughly with paint. The fire retardant paint may be applied to all surfaces that non-retardant paints are applied to, by any means known in the art.

The invention having been fully described by the above-detailed description and accompanying examples, other variations of, and uses for the present invention will become apparent to one skilled in the art. All such variations and uses are intended to be encompassed by the appended claims.

What is claimed is:

1. A method of preparing a fire retardant material comprising the step of, applying a fire retarding amount of a silicate fire retardant composition consisting essentially of silicate, water, and surfactant, to one or more surfaces of a cellular foam plastic sheet material, such that the silicate fire retardant composition fully penetrates said sheet material, wherein the ratio of the silicate to water in the silicate fire retardant composition is between approximately 20/80 (w/w) and approximately 33/67 (w/w), and wherein the volume of the surfactant is between approximately 16 and 64 ounces per approximately 600 pounds of silicate and water.

2. The method of claim 1, wherein the cellular foam plastic sheet material is selected from the group consisting of expanded polystyrene foam, and urethane.

3. The method of claim 1, wherein the silicate of said silicate fire retardant composition is selected from the group consisting of silicate, disilicate, metasilicate, orthosilicate, and tetrasilicate.

4. The method of claim 1, wherein the surfactant of said silicate fire retardant composition is selected from the group consisting of polyoxyethylene ether and dioctyl sodium sulfosuccinate.

5. The method of claim 1, wherein between approximately 0.5 to 4 ounces of said silicate fire retardant composition are applied to each square foot of surface area of at least one surface of the cellular foam plastic sheet material, wherein said sheet material is less than or equal to approximately 7.5 inches thick.

6. The method of claim 1, wherein said cellular foam plastic sheet material is more than approximately 7.5 inches thick, and wherein between approximately 0.5 to 4 ounces of said silicate fire retardant composition, plus an additional 0.5 to 4 ounces of said silicate fire retardant composition for each two inches of thickness of said sheet material above 7.5 inches thick, are applied to each square loot of surface area of at least one surface of said sheet material.

7. The method of claim 1, further comprising the step of applying an additional fire retardant composition to one or more surfaces of said cellular foam plastic sheet material, wherein the additional fire retardant composition is applied after said silicate fire retardant composition, and wherein said additional fire retardant composition is applied to the surfaces of the sheet material to which said silicate fire retardant composition had been applied.

8. The method of claim 7, wherein said additional fire retardant composition is selected from the group consisting of borax, calcium carbonate, zinc stearate, powdered mica, and aluminum trihydrate.

9. The method of claim 7, wherein said additional fire retardant composition is borax.

10. The method of claim 7, wherein between approximately 0.016 and 0.047 pounds of said additional fire retardant composition is applied to each square foot of surface area of said cellular foam plastic sheet material to which said additional fire retardant material is to be applied.

11. The method of claim 1, further comprising the step of applying a weather proofing agent to one or more surfaces of said cellular foam plastic sheet material, wherein the weather proofing agent is applied after said silicate fire retardant composition, and wherein the weather proofing agent is applied to the surfaces of the sheet material to which said silicate fire retardant composition had been applied.

12. The method of claim 11, further comprising the step of applying an additional fire retardant composition to one or more surfaces of said cellular foam plastic sheet material, wherein the additional fire retardant composition is applied after the weather proofing agent is applied to the sheet material, and wherein the additional fire retardant composition is applied to the surfaces of the sheet material to which the weather proofing agent had been applied.

13. The method of claim 1, wherein said cellular foam plastic sheet material is expanded polystyrene foam in sections of approximately four feet by eight feet, wherein the thickness of said expanded polystyrene foam is between approximately 2 to 7.5 inches.

14. The method of claim 13, wherein said section of expanded polystyrene foam has between approximately 4 to 6 pounds of said silicate fire retardant composition applied to at least one surface of said expanded polystyrene foam.

* * * * *